US005743284A

United States Patent [19]

Lumpkin

[11] Patent Number: 5,743,284
[45] Date of Patent: Apr. 28, 1998

[54] CANTILEVER BRAKE WITH PAD ATTITUDE CONTROL

[75] Inventor: Wayne R. Lumpkin, Littleton, Colo.

[73] Assignee: Avid Enterprises, Inc., Englewood, Colo.

[21] Appl. No.: 716,505

[22] Filed: Sep. 18, 1996

[51] Int. Cl.⁶ ............................................. B62L 3/00
[52] U.S. Cl. ............................. 188/24.22; 188/24.12
[58] Field of Search .......................... 188/24.22, 24.12, 188/24.11, 344, 24.19, 24.15

[56] References Cited

U.S. PATENT DOCUMENTS 5,293,965  3/1994  Nagano ........................ 188/24.21

FOREIGN PATENT DOCUMENTS

| 120797 | 1/1946 | Australia . | |
|---|---|---|---|
| 0 490 196 A1 | 11/1991 | European Pat. Off. . | |
| 531805 | 1/1922 | France . | |
| 525705 | 11/1922 | France . | |
| 60629 | 11/1954 | France ...................... | 188/24.12 |
| 642798 | 7/1962 | Italy ......................... | 188/24.12 |
| 255861 | 2/1949 | Switzerland . | |
| 10679 | of 1895 | United Kingdom ........ | 188/24.22 |
| 412373 | 6/1934 | United Kingdom ........ | 188/24.22 |
| 592000 | 9/1947 | United Kingdom . | |

Primary Examiner—Peter M. Poon
Attorney, Agent, or Firm—Swanson & Bratschun LLC

[57] ABSTRACT

A cycle has a frame with wheel supports extending on opposite sides of a wheel rim operatively associated with the cycle frame. The cycle frame includes a pair of brake attachment studs on each wheel support for mounting a brake in operative association with the wheel rim. The brake with pad attitude control consists of first and second brake arms, each having a proximal and a distal end. Each brake arm is pivotally mounted about its proximal end to one of the brake attachment studs of a pair of brake attachment studs. A cable extends between the distal ends of the first and second brake arms which, upon application of force to the cable, pivots the distal ends of the first and second brake arms toward one another. A brake pad mounting bracket is pivotally attached to each brake arm. The brake pad mounting bracket includes a structure for maintaining a brake pad with a brake pad assembly in a select position relative to the brake pad mounting bracket. First and second arch members each have a proximal and a distal end. The proximal end of each arch member is fixedly attached to one of the brake pad mounting brackets. The distal ends of the arch members are pivotally attached. The first and second arch members cooperatively form an arch over the pad mounting brackets of a size sufficient to receive a cycle rim and an associated tire.

18 Claims, 8 Drawing Sheets

CANTILEVER BRAKE WITH PAD ATTITUDE CONTROL

BACKGROUND OF THE INVENTION

1. Technical Field

The present invention is directed toward cycle brakes, and more particularly toward cantilever brakes for cycles.

2. Background Art

Off-road bicycling or mountain biking continues to grow in popularity with each passing year. This popularity has even led to the inclusion of mountain biking in the Summer Olympic Games. The increased popularity of recreational mountain biking and mountain bike racing continues to drive the evolution of mountain bike componentry, particularly the development of mountain bike brakes. For years, the dominant style of mountain bike brakes was the simple centerpull cantilever brake, which consists of a pair of brake arms pivotally mounted at their proximate ends to mounting bosses on a bicycle frame and joined by a straddle cable at their distal ends. A brake pad is attached to the arm usually in proximity to the proximal end of the lever. A brake cable is attached to the center of the straddle cable and the brakes are actuated by pulling up on the brake cable. One problem with the center-pull cantilever brakes is that as the brake cable is pulled upward, the angle of the straddle cable decreases resulting in a proportionately decreased force being applied to the brake pads. One example of traditional center-pull cantilever brake is illustrated by Nagano, U.S. Pat. No. 5,393,965.

One way known in the art to address this problem of proportional decrease in braking force is the so-called side-pull cantilever brake. Side-pull cantilever brakes provide the brake cable extending horizontally between the distal ends of the brake arms. Upon actuation of the brake cable, the brake arms are drawn together and the force is linearly conveyed to the brake pads over the brake actuation. Examples of side-pull cantilevers included French Patent No. 531,805, issued Nov. 18, 1922; Australian Patent No. 120,797, issued Jan. 24, 1946; British Patent No. 592,000, issued Sep. 4, 1947; and Swiss Patent No. 255,861, issued Jan. 31, 1949.

A problem long endured by mountain bike riders is fatigue to the hands and forearms which results from having to apply the brakes over extended descents. Thus, there has been an effort to provide brakes which require less effort to actuate while still providing powerful braking. Because cantilever brakes are simple levers, the easiest way to address this problem is to provide longer brake arms and to move the brake pad as close as possible to the proximal ends of the brake arms. However, as the brake pad is brought closer to the pivotal attachment of the brake arm, the arc of brake pad movement becomes smaller and smaller (i.e., the arc has a smaller radius). This is illustrated schematically by $r_1$ and $r_2$ of the brake pads 2 and 2' acting on the rim 3 and 3' in FIG. 1. One unfortunate result of the smaller arc is that the brake pad typically cannot engage the rim with the brake pad surface flush. Stated another way, the small arch results in a change of pad attitude as the brake is actuated. As a result, the top edge of the pad tends to initially contact the rim, causing excessive wear of the top part of the pad and also causing less than the full brake pad surface to be squeezing the rim, thereby decreasing the effective braking surface and the effectiveness of a braking operation. Another potential problem is that the brake pad tends to be forced under the rim during braking, and if the pad actually slips under the rim, the brake arm will stick in the spokes causing the bike to fall forward possibly resulting in serious injury to the rider. This condition is known as "pad dive". While these problems can be diminished somewhat by increasing the arc of travel of the brake pad by moving the brake pad up on the brake arm, this proportionately decreases the mechanical advantage, thereby decreasing available braking power and making the brakes harder to actuate.

One effort to address this problem is the so-called "parallel push" brake pad attachment structure being sold by Shimano, Inc. of Osaka, Japan. The parallel push structure of Shimano provides a parallelogram with pivotal attachments between the arms of the parallelogram. As the brake arm is pivoted so as to bring the brake pad into engagement with the bicycle rim, the parallelogram structure is intended to maintain the face of the brake pad parallel to the rim, so that the entire face of the brake pad contacts the bicycle rim. While this structure is reasonably effective in increasing the effective pad surface brought into contact with the rim and in eliminating pad dive when the rim walls are parallel, it is not without some serious problems. First, the parallelogram structure requires many precision moving parts which are expensive to manufacture and expensive to assemble. In addition, even if tolerances between the parallelogram segments and their pivotal attachments can be kept reasonably close, because there are four pivots involved, tolerance stacking results in imprecise pad face alignment when they are applied by a user. When rims are inclined toward the rim bead, brake pads tend to migrate upward and can contact the tire, leading to premature tire failure. When rims are inclined toward the hub, the rim diving problem discussed above can arise. Finally, the looseness of the pivots can result in a rattle that is both irritating and lessens the rider's confidence in the brakes.

The present invention is intended to overcome one or more of the problems discussed above.

SUMMARY OF THE INVENTION

The present invention is a brake for a cycle such as a bicycle. The cycle has a frame with wheel supports extending on opposite sides of a wheel rim operatively associated with the cycle frame. The cycle frame includes a pair of brake attachment studs on each wheel support for mounting a brake in operative association with the wheel rim. The brake consists of first and second brake arms, each having a proximal and a distal end. Each brake arm is pivotally mounted about its proximal end to one of the brake attachment studs of a pair of brake attachment studs. A cable extends between the distal ends of the first and second brake arms which, upon application of force to the cable, pivots the distal ends of the first and second brake arms toward one another. A brake pad mounting bracket is pivotally attached to each brake arm. The brake pad mounting bracket includes a structure for maintaining a brake pad with a brake pad assembly in a select position relative to the brake pad mounting brackets. First and second arch members each have a proximal and a distal end. The proximal end of each arch member is fixedly attached to one of the brake pad mounting brackets and the distal ends of the arch members are pivotally attached to each other. The first and second arch members cooperatively form an arch over the pad mounting brackets of a size sufficient to receive a cycle rim and an associated tire.

In a preferred embodiment, the brake cable is axially received in an axially rigid housing with a distal length of the brake cable extending from the distal end of the housing and extending horizontally between the distal ends of the first and second brake arms. The first brake arm includes a bracket at its distal end for axially fixedly receiving the distal end of the cable housing and axially slidably receiving the distal length of the brake cable. The second brake arm has a clamp at its distal end for fixedly attaching the distal end of the brake cable.

The brake may further include a spring biasing the distal ends of the brake arms apart. Preferably, the distal ends are biased apart by a pair of springs each having a central coil with first and second connecting arms extending therefrom. The first connecting arm of each spring is fixedly attached to one of the first and second brake arms proximate the distal end and the second connecting arm of each spring is attached to the distal ends of the arch members. In another embodiment, a compression spring extends between the distal ends of the brake arms.

The brake pad mounting bracket may consist of a body having an elongate channel for receiving a post of a brake pad assembly and a pair of cylindrical arms extending from the body on opposite sides of the elongate channel perpendicular to the elongate channel. In this embodiment, each of the brake arms further includes a slot proximate the proximal end for receiving the brake pad mounting bracket. A pair of holes extend transverse and into the slot and the cylindrical arms of the brake pad mounting bracket are received in the pair of holes of the brake arm.

The cantilever brake of the present invention maintains the face of the brake pad essentially parallel to a rim having parallel walls during actuation of the brakes. Thus, uneven pad wear and pad dive are eliminated. The brake has relatively few moving parts, thereby giving the brakes a tighter feel than prior art alternatives. The minimal number of moving parts and rigid arch structure maintains a consistent pad attitude, eliminating pad migration up or down the rim regardless of any incline of the rim walls. Thus, premature tire wear and pad dive are eliminated. In addition, because fewer parts are required, the side-pull cantilever brake can be manufactured efficiently and inexpensively.

DETAILED DESCRIPTION OF THE PREFERRED EMBODIMENT

Figure 1:
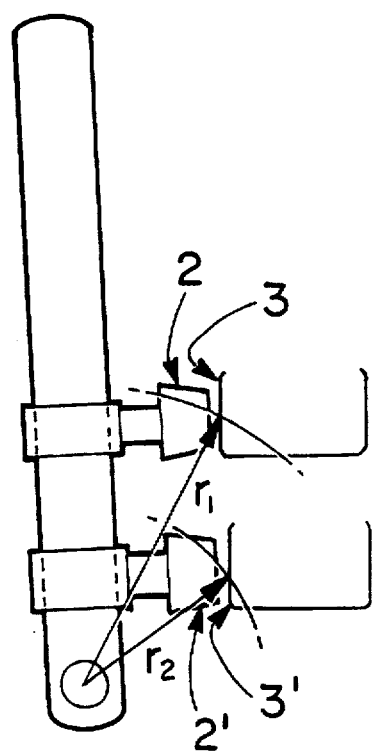
FIG. 1 illustrates the arc of travel of conventional cantilever brakes.
Figure 2:
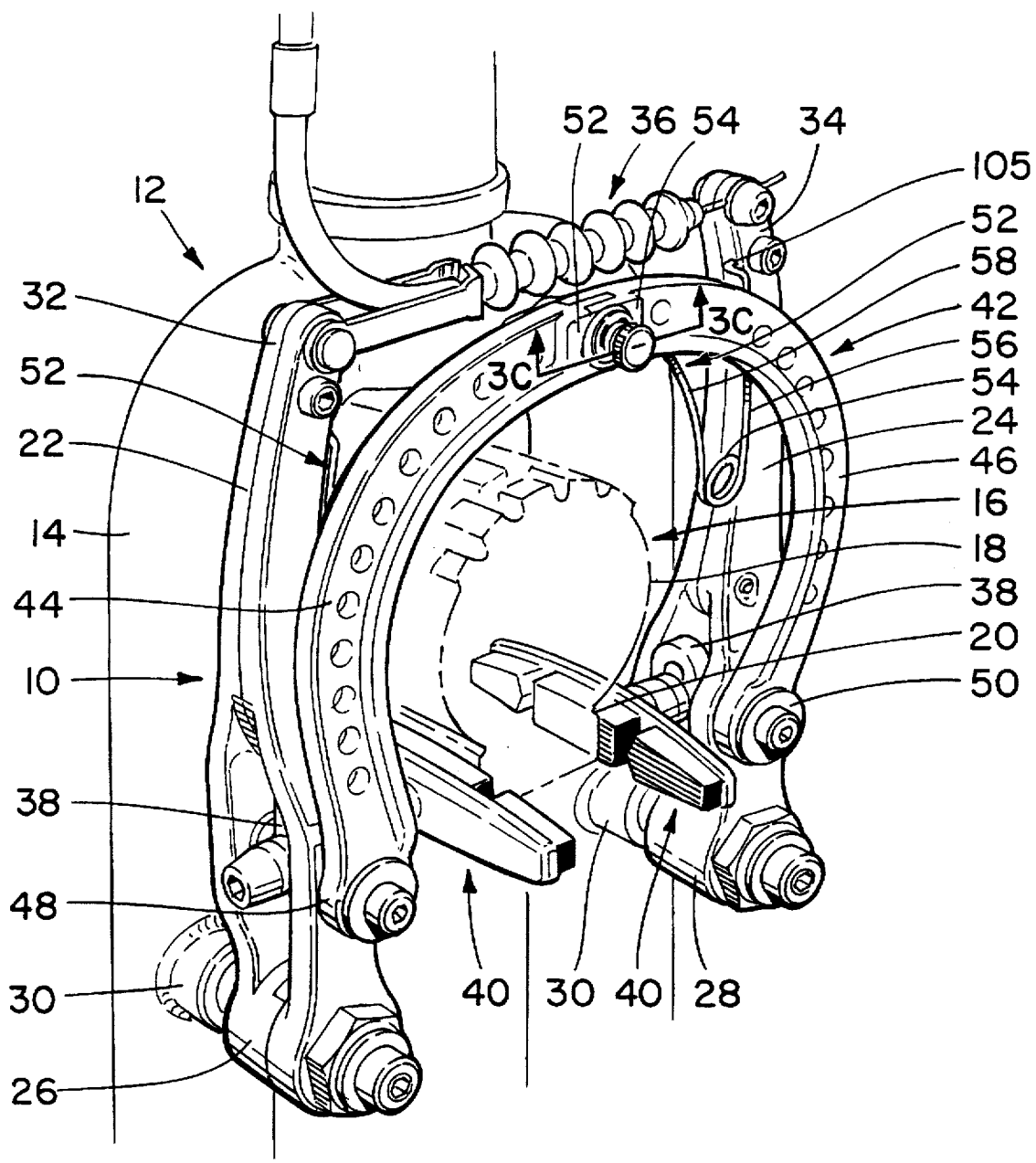
FIG. 2 is a perspective view of the side-pull cantilever brake with pad attitude control of the present invention.

In FIG. 2, a side-pull cantilever brake with pad attitude control 10 is shown mounted to a bicycle frame 12 and more particularly to a front fork 14 of a bicycle frame 12 in an operative position with respect to a bicycle wheel 16 which includes a tire 18 and a rim 20. Although the preferred embodiment contemplates a side-pull cantilever brake, the invention would work equally well with center-pull cantilever brakes and such brakes are considered within the scope of the disclosure and claims.

The side-pull cantilever brake with pad attitude control 10 includes a first brake arm 22 and a second brake arm 24. The proximal end 26 of the first brake arm 22 and the proximal end 28 of the second brake arm are pivotally attached to brake mounting bosses 30 attached to the bicycle frame on opposite sides of the rim 20. The distal end 32 of the first brake arm 22 and the distal end 34 of the second brake arm 24 are joined by a cross-cable linkage 36. A brake pad assembly mounting bracket 38 is attached proximate the proximal end to each of the first and second brake arms 22, 24 and maintain a brake pad assembly 40 in operative position relative to the rim 20. An arch 42 consists of a first arch member 44 and a second arch member 46. The first arch member 44 is fixedly attached at its proximal end 48 to the brake pad mounting bracket 38 of the first brake arm 22 and to the second arch member 46 is fixedly attached at its proximal end 50 to the brake pad assembly mounting bracket 38 of the second brake arm 24. The distal ends 52, 54 of the first and second arch members 44, 46 are pivotally attached to form an arch which extends over the brake assembly pad mounting brackets 38. The arch is of a size sufficient to receive the rim 20 and tire 18 of the bicycle wheel 16 therethrough. A pair of coil springs 53 having substantially equal spring coefficients are attached between the distal ends 32, 34 of the first and second brake arms 22, 24 and the distal ends 52, 54 of the first and second arch members 44, 46. Each spring 53 consists of a coil 55 and a first leg 56 and a second leg 58, with the first leg 56 attached to the distal end of the brake arms and the second leg 58 attached to the distal end of the arch members.

Figure 3A:
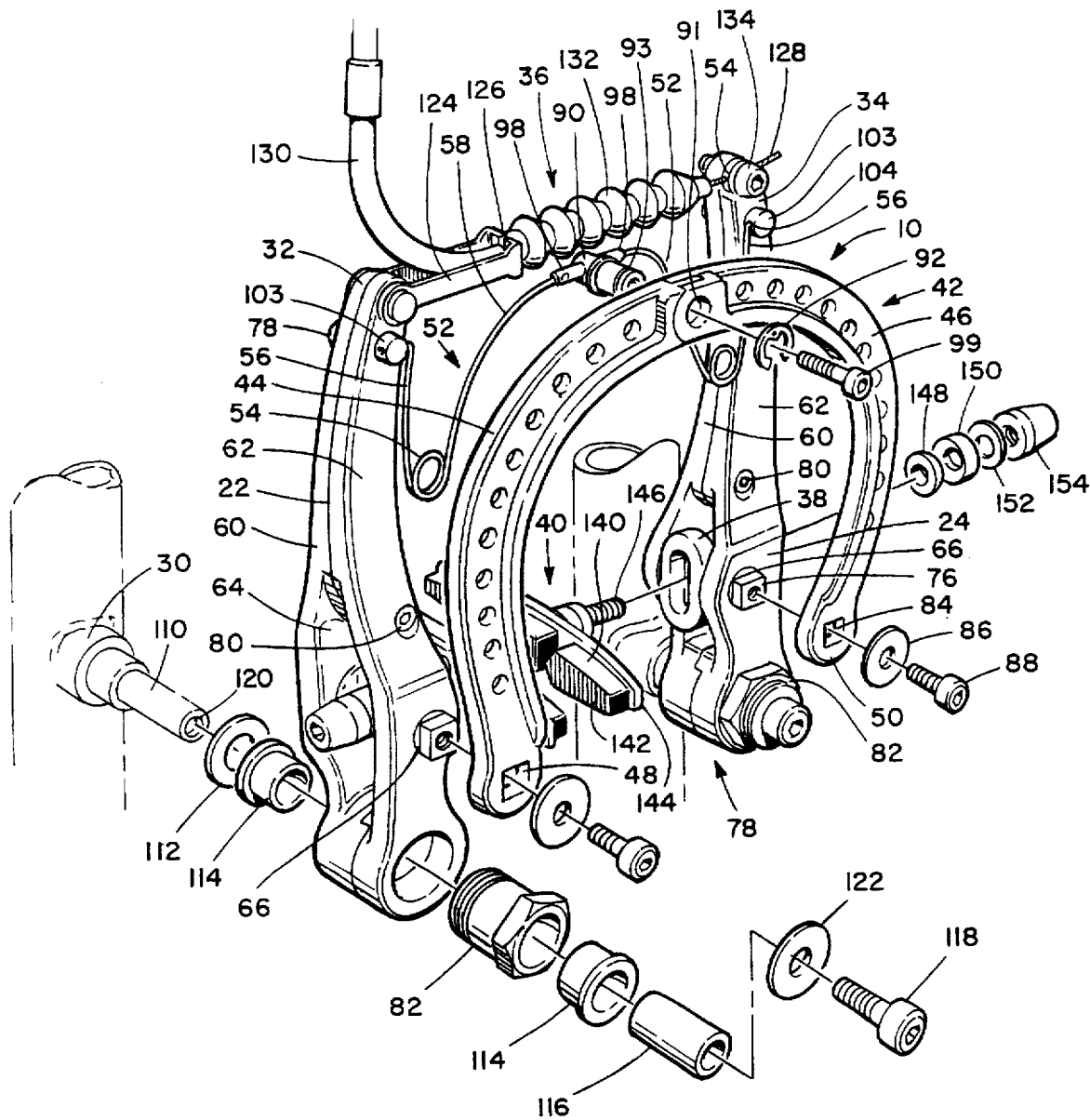
FIG. 3A is an exploded view of the side-pull cantilever brake of FIG. 2.

The side-pull cantilever brake with pad attitude control 10 is shown in somewhat greater detail in the exploded perspective view of FIG. 3A. Each of the first and second brake arms 22, 24 are mirror images and so all like parts will have like reference numbers. The brake arms consist of first and second length-wise halves 60, 62. Each of the halves 60, 62 have a length-wise cavity proximate the proximal end 26, 28 which, when the first and second length-wise halves are brought into abutment as illustrated in FIG. 3A, defines a slot 64. A circular hole 66 extends through each of the first and second length-wise halves transverse and into the slot 64 (but only the hole 66 in the second length-wise halves 62 can be seen).

Figure 3B:
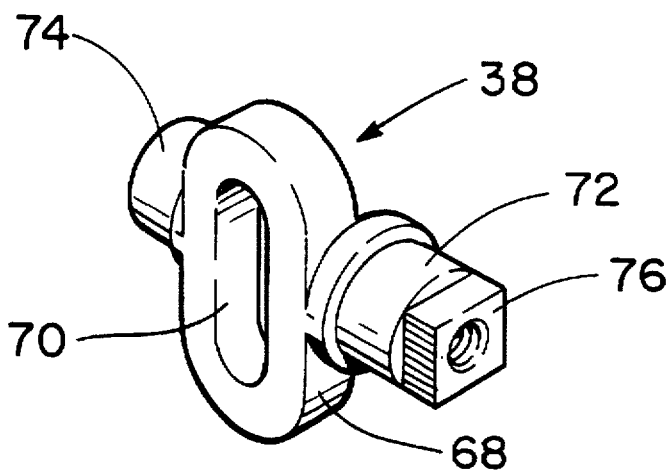
FIG. 3B is a perspective view of the brake pad assembly mounting bracket of the side-pull cantilever brake of FIG. 2.

With reference to FIG. 3B, the brake pad assembly mounting bracket 38 can be seen to include a body 68 having an elongate channel 70 therethrough. A pair of cylindrical arms 72, 74 extend from the body 68 on opposite sides of the elongate channel 70. The distal end of 76 of the arm 72 is a square configuration. As seen in FIG. 3A, the brake pad assembly mounting brackets 38 fit within the slot 64 with the arms 72, 74 received in the holes 66 with the square distal end 76 extending outward and forward from the second length-wise half 62. Thus, the brake pad assembly mounting brackets 38 may pivot relative to the brake arms 22, 24.

The proximal ends of the first and second length-wise halves 60, 62 are dove-tailed as indicated at 78 to minimize the possibility of relative motion between the first and second length-wise halves 60, 62. Once halves are placed in abutment as indicated in FIG. 3, they are held together by the first and second screws 78, 80 and also by the hollow threaded bolt 82.

The arch 42 is fixedly attached to the brake pad assembly mounting brackets 38 by the square hole 84 at the distal ends 48, 50 of the first and second arch members 44, 46 which receive the square distal ends 76 of the brake pad assembly mounting brackets 38. The arch members 44, 46 are then held in place by the washer 86 and bolts 88. The pivotal connection at the distal ends 52, 54 of the first and second arch members 44, 46 is accomplished by a pin 90 which is inserted through coaxial mating holes 91 at the distal ends of the first and second arch members. The pin is secured axially in place by the e-clip 92 which engages the annular groove 93.

Figure 3C:
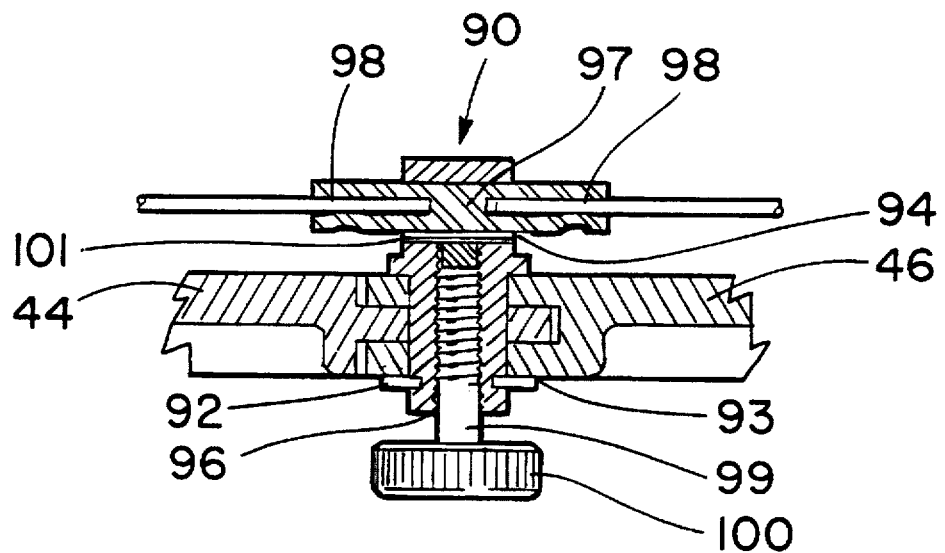
FIG. 3C is a cross-sectional view taken along line 3C—3C of FIG. 2.

The pin 90 is shown in greater detail in the cross-sectional view of FIG. 3C. The pin 90 has a transverse hole 94 therethrough and an annular stop flange 95 between the transverse hole 94 and the annular groove 93. The space between the stop flange 95 and groove 93 is sized to snugly receive the distal end 52, 54 of the first and second arch members 44, 46. The distal ends of second legs 58 of the coil springs 53 could fit directly into the transverse hole 94. However in a preferred embodiment, the pin 90 also has an axial internally threaded bore 96 perpendicular to and intersecting with the transverse hole 94. An adjustment bar 97 having axial holes 98 at each end is axially slidably received in the transverse hole 94. A thumb screw 99 having a knurled head 100 is screwed into the axial bore 96 and its distal end can be brought into engagement with the adjustment bar 97 to secure it axially at a select position in the transverse hole 94. A malleable cushion 101 such as a piece of aluminum may be provided in the transverse hole 94 to form a pad between the distal end of the screw 99 and the adjustment bar 97.

Referring to FIG. 3A, a nut 103 threads onto the distal end of the screw 78 and includes a transverse hole 104 for receiving the first ends 56 of the springs 58. Alternatively, a plastic cap with a transverse hole could be employed. The advantage to this embodiment is that the springs 53 are interchangeable. Alternatively, as illustrated in FIG. 2, a hole 105 could be provided in the distal end of the brake arm and the second leg 58 of the spring 53 would include a bend to engage the hole. While eliminating the need for the nut 103 or plastic cap, this embodiment would not enable the springs 53 to be interchangeable.

In an alternative to the preferred embodiment discussed above, which is not illustrated, the spring is a single length of wire resembling the spring 53 without the coils 55. The wire is axially inserted through the transverse hole 94 and the ends are inserted into holes 104 in the nuts 103. The wire can slide and be secured axially within the transverse hole 94 by the thumb screw 99.

The first and second brake arms 22, 24 are attached to the brake attachment bosses 30 by means of a stepped stud 110 threadably received within the boss 30. As seen in FIG. 3, the washer 112 is received over the stepped stud 110. Flanged bearings 114 are press-fit into the bore of the hollow threaded bolt 82. A bushing 116 is also press-fit into the hole of the flanged bearings 114 and the assembly is held in place on the stepped stud 110 by a bolt 118 which threadably engages an internally threaded cavity 120 in the stepped stud 110. The washer 122 between the head of the bold 118 and the sleeve 116 helps maintain the bolt 118 in the internally threaded bore 120 of the stepped stud 110.

The cross-cable linkage 36 consists of a link 124 pivotally attached to the distal end 32 of the first brake arm 22. The distal end of the link contains a slot 126. The slot is sized to allow a brake cable 128 to be received in the slot and to move axially relative to the slot, yet to prevent axial movement of the noodle 130 which makes up part of the housing for cable 128. An articulated sheath 132 covers the brake cable 128 between the first and second brake arms 22, 24 to protect it from grit and other potentially harmful elements. The distal end of the brake cable 128 is secured by a clamp 134 at the distal end 34 of the second brake arm 24.

The brake pad assemblies 40 consist of a brake pad 140 having a braking surface or face 142 attached opposite the braking surface to a brake pad frame 144. A threaded shaft 146 extends rearwardly from the brake pad frame 144. As will be readily understood by those skilled in the art, a pair of adjustment washers 148, 150 fit on the threaded shaft 146 between the body 68 of the brake pad assembly mounting bracket 38 and the brake pad frame 144. A washer 152 is then received on the distal end of the threaded shaft 146 and the shaft is held in desired position by the nut 154.

Figure 4:
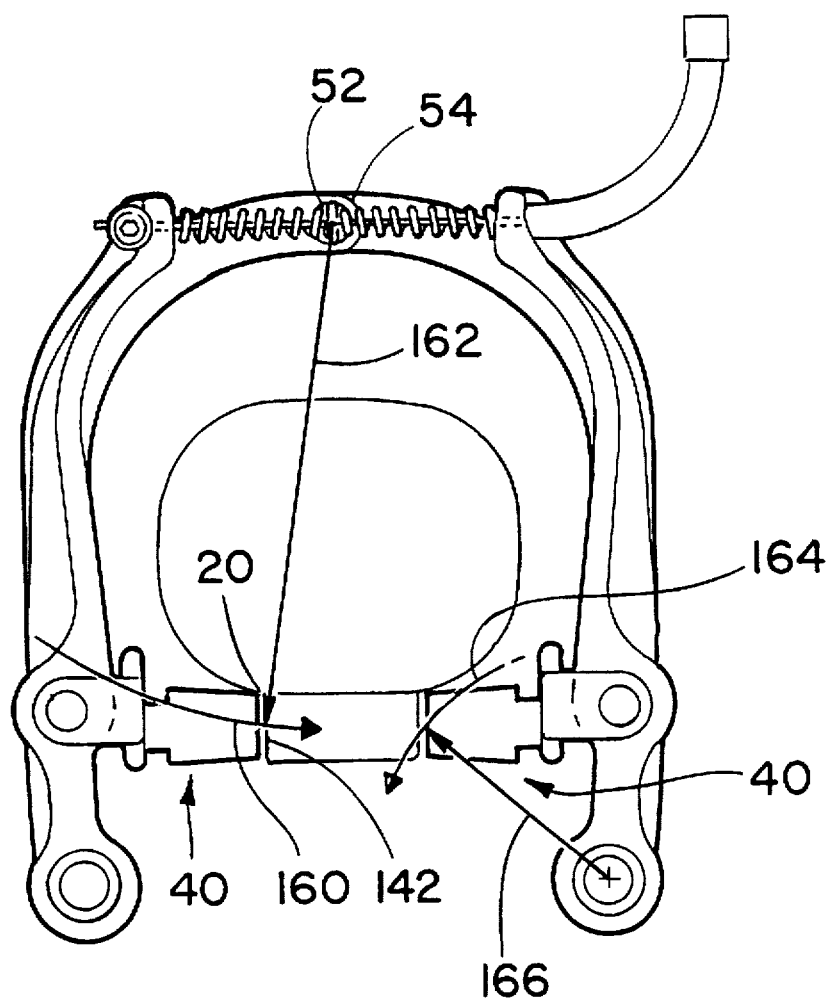
FIG. 4 is a schematic illustrating the arc of travel of the pads of the side-pull cantilever brake of the present invention as compared to prior art cantilever brakes.

With the side-pull cantilever brake with pad attitude control 10 assembled as described above, it functions as follows. The springs 53 bias the distal ends of the first and second brake arms 22, 24 apart. The relative spring force between the springs 53 can be readily adjusted by hand by loosening the thumb screw 99 and sliding the adjustment bar 97 lengthwise a select amount and tightening the thumb screw 99 to maintain the adjustment bar 97 in a select axial position. When braking is desired, a brake lever (not shown) attached to the proximal end of the brake cable 128 applies tension to the brake cable, drawing the distal ends of the first and second brake arms together. Referring now to the schematic illustration in FIG. 4, upon actuation of the brake, the brake pad assemblies 40 swing about an arc 160 having a radius 162 from the pivotal connection between the distal ends of the first and second arch 44, 46. This is illustrated with the left brake arm. The relatively long radius and flat arc 160 results in approximately a one degree variation between the attitude of the braking pad surface 142 as it swings into engagement with the rim face 20. In addition, the arc 160 does not facilitate "pad dive" under the rim 20, but rather pivots the pad upward relative to the rim 20. By way of contrast, and as illustrated with the right brake arm in FIG. 4, without the arch 42 assembly, the pad would move in the sharper arc 164 with the smaller radius 166. This would result in approximately a three degree change in the attitude of the pad face 142 and further moves the pad face in a downward direction facilitating pad dive.

The rigidity and solidness of the brake feel is further enhanced by placing the brake pad assembly mounting bracket 38 and the slot 64 between the brake legs. Other known brake designs cantilever the brake pad adjustment bracket either forward or rearward of the brake arms, which gives the brakes a looser feel (see FIGS. 5 and 6).

Figure 5:
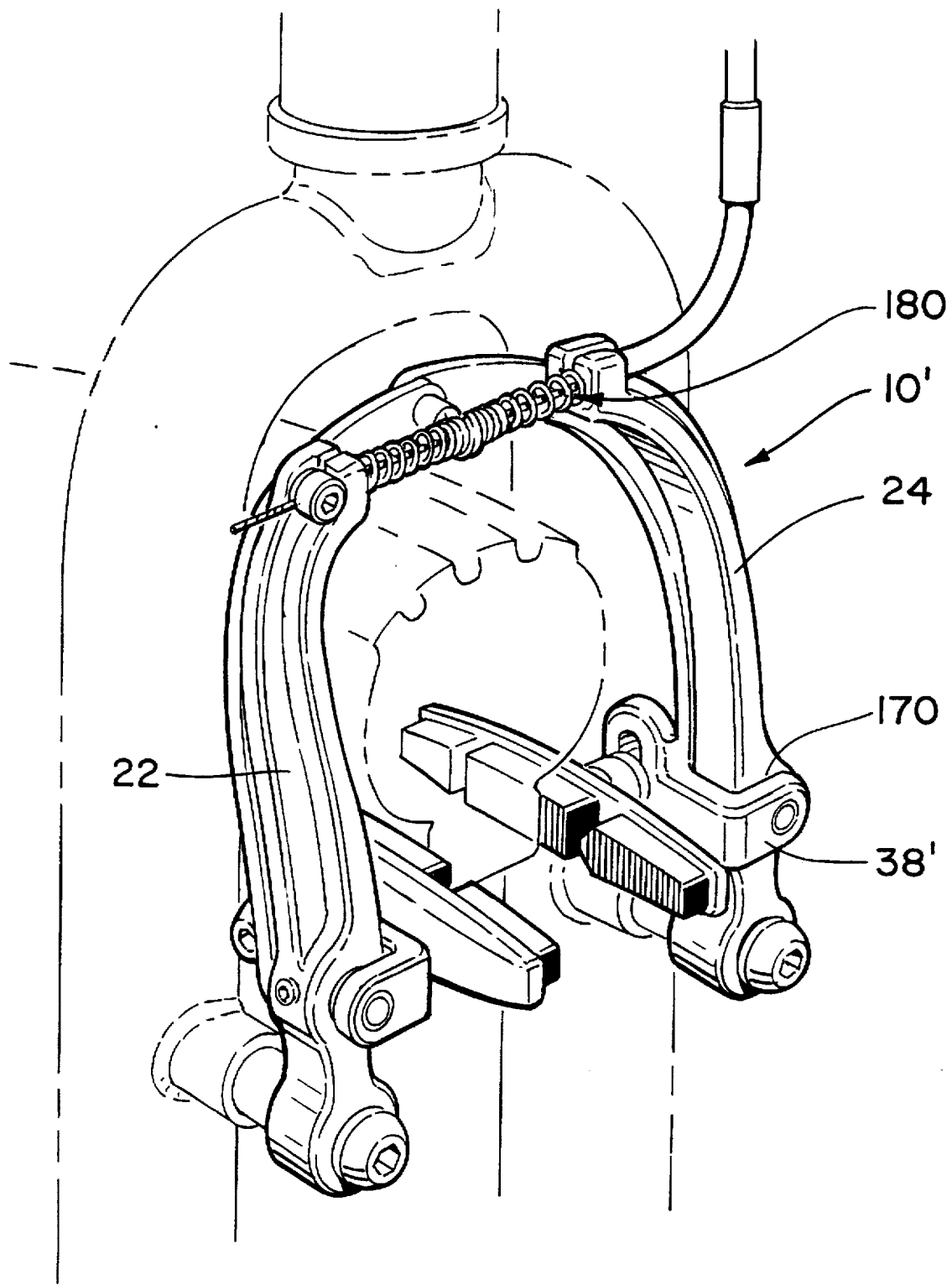
FIG. 5 is a perspective view of an alternate embodiment of the side-pull cantilever brake with pad attitude control.
Figure 6:
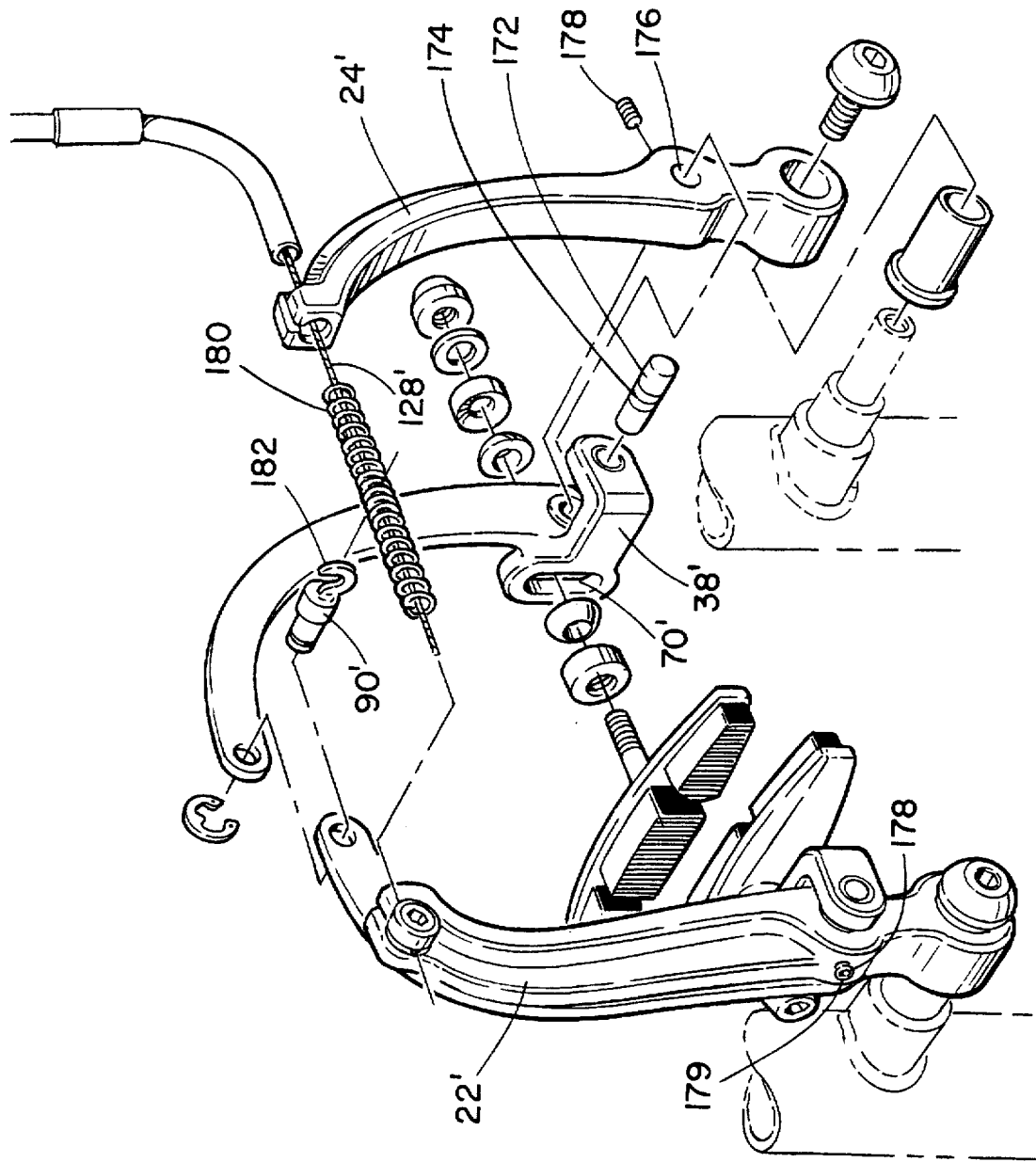
FIG. 6 is an exploded view of the alternate embodiment of the side-pull cantilever brake of FIG. 5.

An alternate embodiment of the side-pull cantilever brake with pad attitude control 10' is illustrated in FIGS. 5 and 6. In this embodiment, each of the first and second brake arms 22', 24' are one piece and the brake pad mounting bracket 38' consists of a clevis 170 which receives the brake arms 22', 24'. As shown in FIG. 5, a pin 172 having a radial groove 174 about its center is inserted through holes in the ends of the clevis 170 and hole 176 in the brake arm. A set screw 178 is then threadably received in a hole 179 transverse the hole 176 in the brake arm to pivotally secure the brake arm to the brake pad assembly bracket 38'. In this configuration, the slot 70' of the brake pad assembly mounting bracket 38' is cantilevered rearward of the brake arms 22', 24'. The only other significant difference in this embodiment is that the coil springs 53 are replaced by the elongate coil spring 180 between the distal ends of the first and second lever arms 22, 24. The brake cable 128' is received inside the elongate coil 180. A hook 182 is provided on the end of the pin 90' to engage between adjacent coils of the elongated coil spring 180. This enables the relative spring force of each side of the elongate coil spring to be varied by moving the point of engagement with the hook 182 lengthwise along the elongated coil spring 180. Alternatively, a clip or other structure could be used to grasp the spring when, for example, the spring is inside a casing or the spring is an articulated polymer.

Figures 7A, 7B:
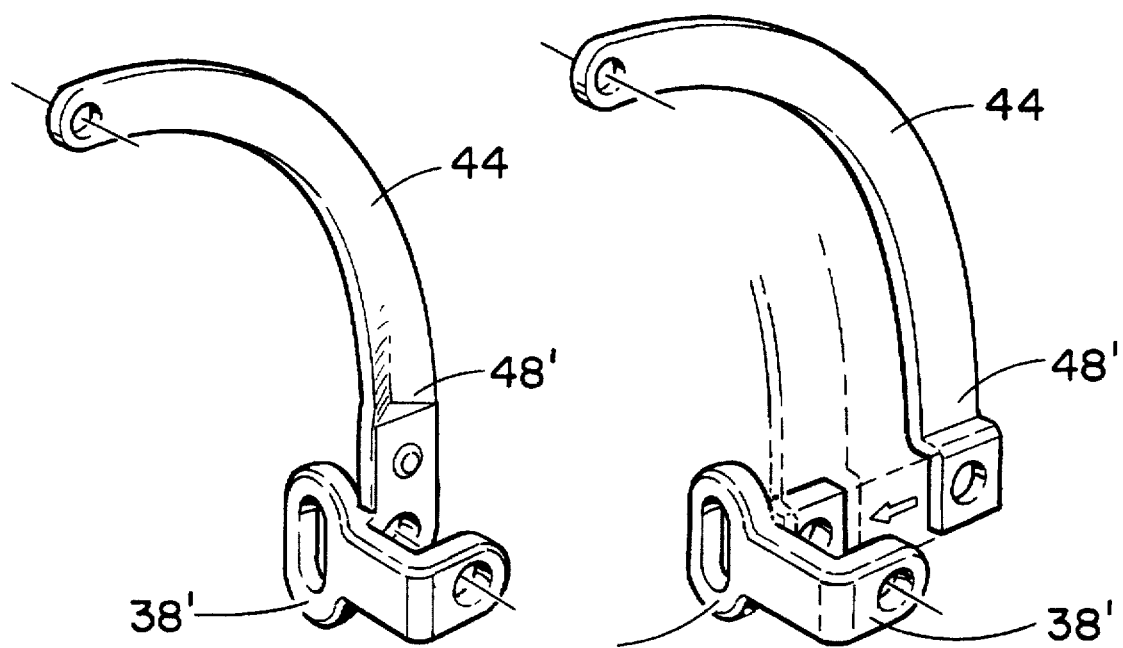
FIGS. 7A and 7B are alternate embodiments of the arch member and brake pad mounting bracket of FIG. 5.

In this embodiment, the brake pad assembly mounting bracket 38 may be integrally formed at the proximal end of each of the first and second arch members 44, 46 or, as illustrated in FIGS. 7A and B, the brake pad assembly mounting bracket 38' may be separately fabricated and then attached to the proximal ends 48' to the arch member 44.

The side-pull cantilever brake with pad attitude control provides significant advantages over conventional cantilever brakes and prior art attempts to control the angle of the pad face relative to the rim (or pad attitude). The arch structure results in the pad moving in an arc in an upward path, eliminating the possibility of pad dive. The arch structure, with a minimal number of moving parts, minimized tolerance stacking and allows less play in the pad than prior art alternatives. This both eliminates bothersome rattling and eliminates brake pad drift. The side-pull cantilever brakes, by placing the brake pad mounting bracket inside the brake arms, eliminates cantilevering of the brake pads, thereby providing brakes with a firmer feel. The side-pull cantilever brakes with pad attitude control also facilitate placing brake pads close to the pivotal connection of the brake arm to the bike frame, maximizing mechanical advantage and braking power. Thus, the brakes are inherently more reliable and instill users with greater confidence than prior art side-pull cantilever brakes. The relative force of biasing springs can readily be altered by hand, allowing adjustment on the trail without tools. These many advantages are achieved with a minimal number of parts that can be manufactured and assembled relatively inexpensively.

What is claimed is:

1. A cantilever brake for a bicycle comprising:

first and second brake arms, each having a distal and a proximal end;

pivotal mounting means at the proximal end of each brake arm for pivotally mounting each brake arm to a brake arm attachment stud of a bicycle frame;

means for attaching a brake pad assembly to each brake arm proximate the pivotal mounting means;

a spring extending between the distal ends of the brake arms to bias the distal ends of the brake arms apart; and a clamp in a fixed position relative to the distal ends of the brake arms, the clamp receiving a portion of the spring and being selectively placed in an open state wherein the portion of the spring is slidable laterally relative to the clamp and a closed state wherein the portion of the spring is fixed laterally relative to the clamp.

2. A cantilever brake for a bicycle, the cantilever brake comprising:

first and second brake arms, each having a distal end and a proximal end:

pivotal mounting means at the proximal end of each brake arm for pivotally mounting each brake arm to a brake arm attachment stud of a bicycle frame;

pivotal attachment means for pivotally attaching a brake pad assembly to each brake arm proximate the pivotal mounting means; and first and second arch members, each arch member having a proximal end and a distal end, the proximal end of each arch member being fixedly attached to one of the pivotal attachment means and the distal ends of the arch members being pivotally attached, the first and second arch members cooperatively forming an arch over the pivotal attachment means.

3. The cantilever brake of claim 2 further comprising:

biasing means extending between the distal ends of the first and second brake arms for biasing the distal ends of the first and second brake arms apart.

4. The cantilever brake of claim 3 wherein the biasing means comprises:

a spring having a first and a second end, with the first end attached to the distal end of the first brake arm and the second end attached to the distal end of the second brake arm; and securing means attached to the distal end of at least one of the arch members for grasping a select portion of the spring to secure the select portion of the spring in a fixed position relative to the distal ends of the brake arms.

5. The cantilever brake of claim 4 wherein the spring is a single length of wire.

6. The cantilever brake of claim 4 wherein the spring comprises a pair of spring members each having a first and second leg extending from a coil, with the first legs attached to the distal ends of the first and second brake arms and the second legs axially received in axial holes of an adjustment bar, the adjustment bar being in operative engagement with the securing means.

7. A brake for a cycle, the cycle having a frame with wheel supports extending on opposite sides of a wheel rim operatively associated with the cycle frame, the cycle frame further having a pair of brake attachment studs on each wheel support for mounting the brake in operative association with the wheel rim, the brake comprising:

first and second brake arms each having a proximal and a distal end;

pivotal mounting means for pivotally mounting the proximal end of each brake arm to one of the brake attachment studs of a pair of brake attachment studs;

actuating means for pivoting the distal ends of the first and second brake arms toward one another;

a brake pad mounting bracket pivotally attached to each brake arm, each brake pad mounting bracket including means for maintaining a brake pad of a brake pad assembly in a select position relative to the brake pad mounting bracket; and first and second arch members, each arch member having a proximal and a distal end, the proximal end of each arch member being fixedly attached to one of the brake pad mounting brackets and the distal ends of the arch members being pivotally attached, the first and second arch members cooperatively forming an arch over the pivotal mounting means of size sufficient to receive a cycle rim and an associated tire therethrough.

8. The brake of claim 1 wherein the actuating means comprises a brake cable axially received in an axially rigid housing with a distal length of the brake cable extending axially from a distal end of the housing and extending horizontally between the second distal ends of the first and second brake arms with the first brake arm having a means at its distal end for axially fixedly receiving the distal end of the housing and axially slidably receiving the distal length of the brake cable and the second brake arm having means at its distal end for fixedly attaching the distal end of the brake cable.

9. The brake of claim 7 further comprising means operatively associated with the brake arms for biasing the distal ends of the brake arms away from each other.

10. The brake of claim 9 wherein the biasing means comprising a pair of springs each having a central coil with first and second connecting arms extending therefrom, the first connecting arm of each spring being fixedly attached to one of the first and second brake arms proximate the distal end and the second connecting arm of each spring being fixedly attached to the distal ends of the arch members.

11. The brake of claim 10 wherein the distal ends of each arch member has a hole and the distal ends are pivotably attached by the holes being coaxially aligned with a pin therethrough, the pin having a distal end with a pair of holes for receiving the second connecting arm of each spring.

12. The brake of claim 11 wherein each of the first and second arch members are integrally formed with its associated brake pad mounting.

13. The brake of claim 7 wherein each brake arm further comprises a slot proximate the proximal end for receiving the brake pad mounting bracket.

14. The brake of claim 13 wherein the brake pad mounting bracket comprises a body having an elongate channel for receiving a part of a brake pad assembly and a pair of cylindrical arms extending form the body on opposite sides of the elongate channel perpendicular to the elongate channel, each brake arm further comprises a pair of holes extending transverse and into the slot and the cylindrical arms of the brake pad mounting bracket are received in the pair of holes of the brake arm.

15. The brake of claim 7 further comprising biasing means operatively associated with the brake arms for biasing the distal ends of the brake arms comprising:

a pin, the pin being received in coaxial holes in the distal ends of the first and second arch members to pivotally join the distal ends, the pin including a cantilevered portion extending from the coaxial holes and a transverse hole through the cantilevered portion;

an adjustment bar axially inserted in the transverse hole, the adjustment bar having an axial bore in each end and being slidable axially within the transverse hole;

means for releasably securing the adjustment bar at a select position axially within the transverse hole;

a pair of springs, each spring having a first and a second end, the second end of each spring being axially received in one of the axial bores of the adjustment bar; and means for attaching the first end of each spring to the distal end of one of the brake arms.

16. The brake of claim 15 wherein each spring has substantially the same spring coefficient and the effective biasing force of each spring can be varied relative to the other by sliding axially the adjustment bar within the transverse hole and, using the releasable securing means, securing the adjustment bar at a select position.

17. The brake of claim 15 wherein the releasably securing means comprises:

an axial, internally threaded bore in the pin, the bore intersecting the transverse hole; and a thumb screw threadably received in the threaded bore, the thumb screw having a length greater than the length of the internally threaded bore, whereby a distal end of the thumb screw can be screwed into contact with the adjustment bar to secure it in place and screwed out of contact with the adjustment bar to enable it to slide axially within the transverse hole.

18. The brake of claim 7 further comprising biasing means operatively associated with the brake arms for biasing the distal ends of the brake arms away from each other, the biasing means comprising:

an adjustment bar having an axial bore in each end;

receiving means fixedly attached to the arch members proximate their distal ends intermediate their proximal ends for axially slidably receiving the adjustment bar;

means for releasably securing the adjustment bar at a select position axially relative to the receiving means;

a pair of springs, each spring having a first and a second end, the second end of each spring being axially received in one of the axial bores of the adjustment bar; and means for attaching the first end of each spring to the distal end of one of the brake arms.

* * * * *